(12) United States Patent  (10) Patent No.: US 6,179,496 B1
Chou  (45) Date of Patent: Jan. 30, 2001

(54) COMPUTER KEYBOARD WITH TURNABLE KNOB

(75) Inventor: Chin-Wen Chou, Taipei (TW)

(73) Assignee: Shin Jiuh Corp., Hsien-Tien (TW)

( * ) Notice: Under 35 U.S.C. 154(b), the term of this patent shall be extended for 0 days.

(21) Appl. No.: 09/472,788

(22) Filed: Dec. 28, 1999

(51) Int. Cl.⁷ ....................................................... B41J 5/12
(52) U.S. Cl. ........................................... 400/472; 400/477
(58) Field of Search ................................... 400/472, 477, 400/479, 485, 489; 341/22, 35; 345/168, 169, 172; 361/680

(56) References Cited

U.S. PATENT DOCUMENTS

| | | | |
|---|---|---|---|
| 4,846,597 | * 7/1989 | Bryant | 400/472 |
| 5,408,621 | * 4/1995 | Ben-Arie | 400/485 |
| 5,416,498 | * 5/1995 | Grant | 400/489 |
| 5,438,331 | * 8/1995 | Gilligan et al. | 341/35 |
| 5,627,531 | * 5/1997 | Posse et al. | 341/22 |
| 5,701,123 | * 12/1997 | Samulewicz | 341/22 |
| 5,957,595 | * 9/1999 | Chen | 400/489 |

\* cited by examiner

*Primary Examiner*—John S. Hilten
*Assistant Examiner*—Anthony H. Nguyen
(74) *Attorney, Agent, or Firm*—Bacon & Thomas

(57) ABSTRACT

An improved keyboard structure comprises a base, a pan body, and a top cover. A user is supposed to turn a turnable functional pushbutton to a specified function item, then click the pan body for the computer to execute the related program.

16 Claims, 7 Drawing Sheets

COMPUTER KEYBOARD WITH TURNABLE KNOB

BACKGROUND OF THE INVENTION

This invention relates to an improved keyboard structure, particularly to a keyboard that is provided with an additional turnable functional pushbutton for easy operation.

A computer keyboard is one of the indispensable peripheral devices for input of data or graphics, and for simplification, some related makers have designed a mouse and a plurality of functional keys on the computer keyboard (usually 24 keys shown in FIG. 1).

This simplified design does provide an easy operation, for example, one can press a single functional key to link the web, then another to search data desired instead of typing many keys, however, the increment of functional keys on the other hand enlarges the size of the computer keyboard that requires more assembling labor and increases production cost accordingly.

SUMMARY OF THE INVENTION

In view of abovesaid imperfection, the primary object of this invention is to provide at least a turnable functional pushbutton for easy operation.

Another object of this invention is to gather a plurality of functional keys on a turnable functional pushbutton in order to lessen the area and volume of the computer keyboard for cost reduction.

A further object of this invention is to make it possible for printing predetermined functional items of a turnable functional pushbutton directly or attaching an adhesive label of the functional items or inserting a plurality of indication paper sheets in preset vision windows on a top cover of a computer keyboard.

For achieving abovesaid goals, the keyboard having the turnable functional pushbutton comprises a base, a pan body, and a top cover to enable a user to turn and click the functional pushbutton to function as desired in an easy operation.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
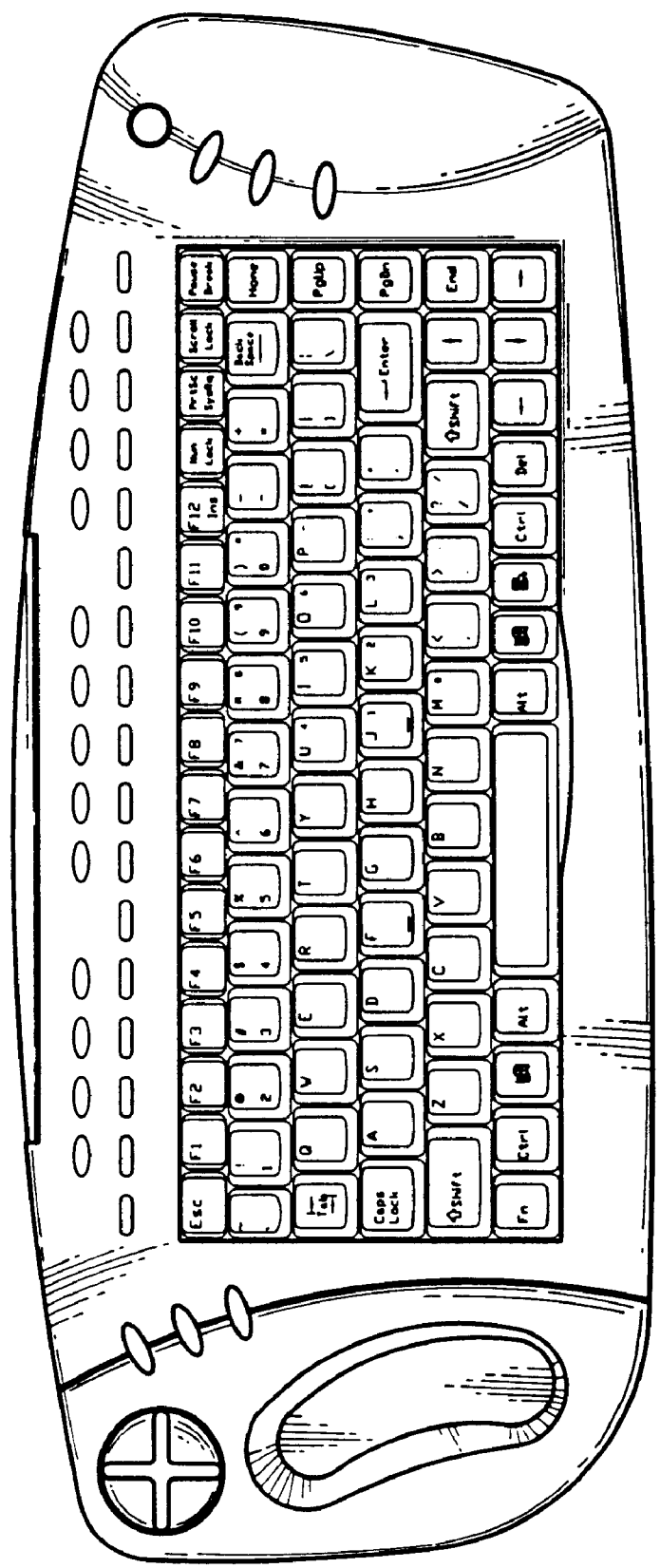
FIG. 1 is a schematic view of a prior keyboard.
Figure 2:
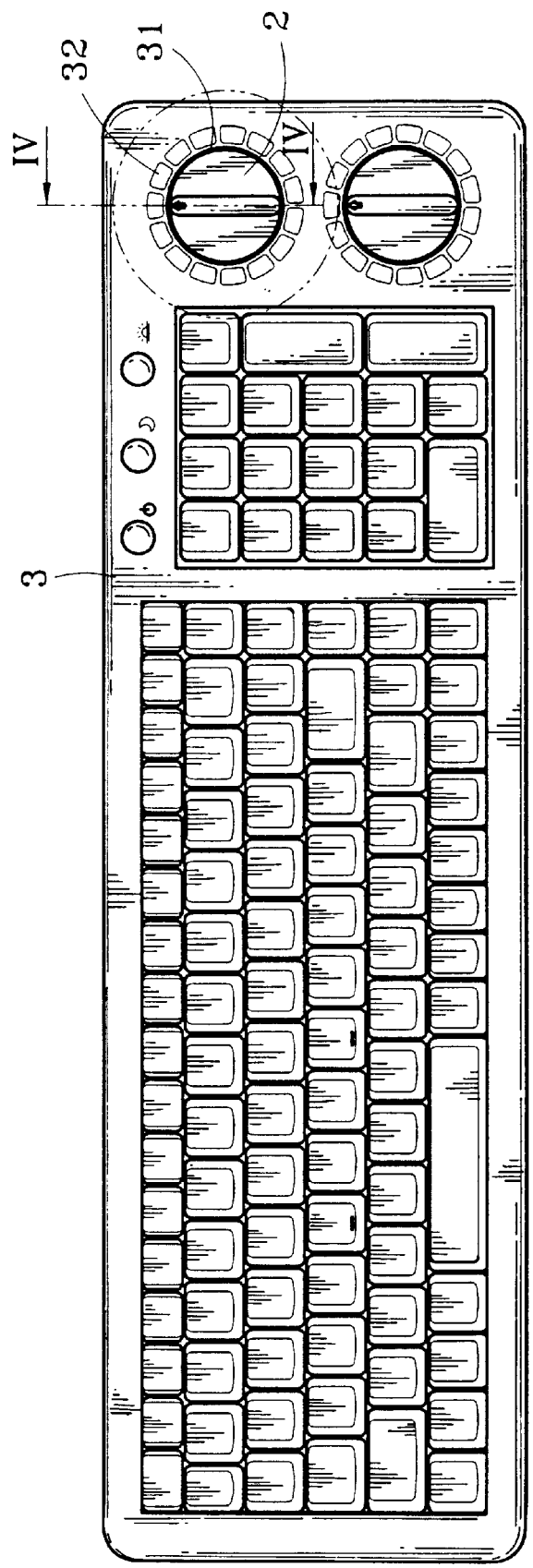
FIG. 2 is a front view of a keyboard of this invention.
Figure 3:
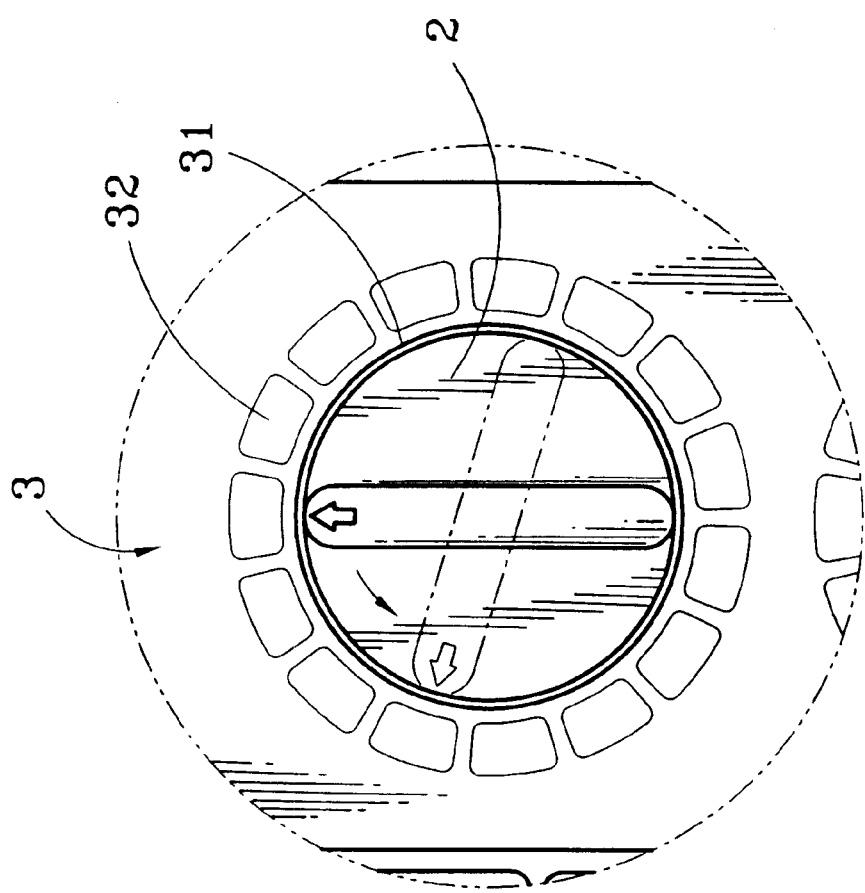
FIG. 3 is an enlarged view of a turnable functional pushbutton shown in FIG. 2.

As shown in FIG. 2 through FIG. 4A, an improved keyboard structure of this invention is to provide an all-in-one turnable functional pushbutton gathering all the functions of the prior functional keys so that a user can turn and click the turnable functional pushbutton for performing a specified function each time in an easy operation, wherein the improved keyboard mainly comprises a base 1, a pan body or knob 2, and a top cover 3.

A support portion 11 located on the base 1 is provided with a positioning portion 12 peripherally, which includes at least a locating dimple 121 and one thin-film circuit 13.

A storage portion, or recess, 21 formed in the pan body 2 is used to accommodate the support portion 11, wherein an elastic element 22 is placed between the storage portion 21 and the support portion 11; a positioning mechanism 23 formed at a bottom portion of the pan body 2 comprises a positioning unit 231 and an elastic element 232, wherein the positioning unit 231 is a spherical body rollable on the positioning portion 12 while the elastic element 232 is a spring body that drives the positioning unit 231 to act; and a click portion 24 for clicking the thin-film circuit 13 is disposed at the bottom portion of the pan body 2.

Moreover, an action district, or area for receiving the knob, 31 is programmed on the top cover 3 for disposition of the pan body 2, wherein an index for indicating a plurality of function items 32 is arranged peripherally around the action district 31 to thus form a brand new keyboard of this invention.

Figure 4A:
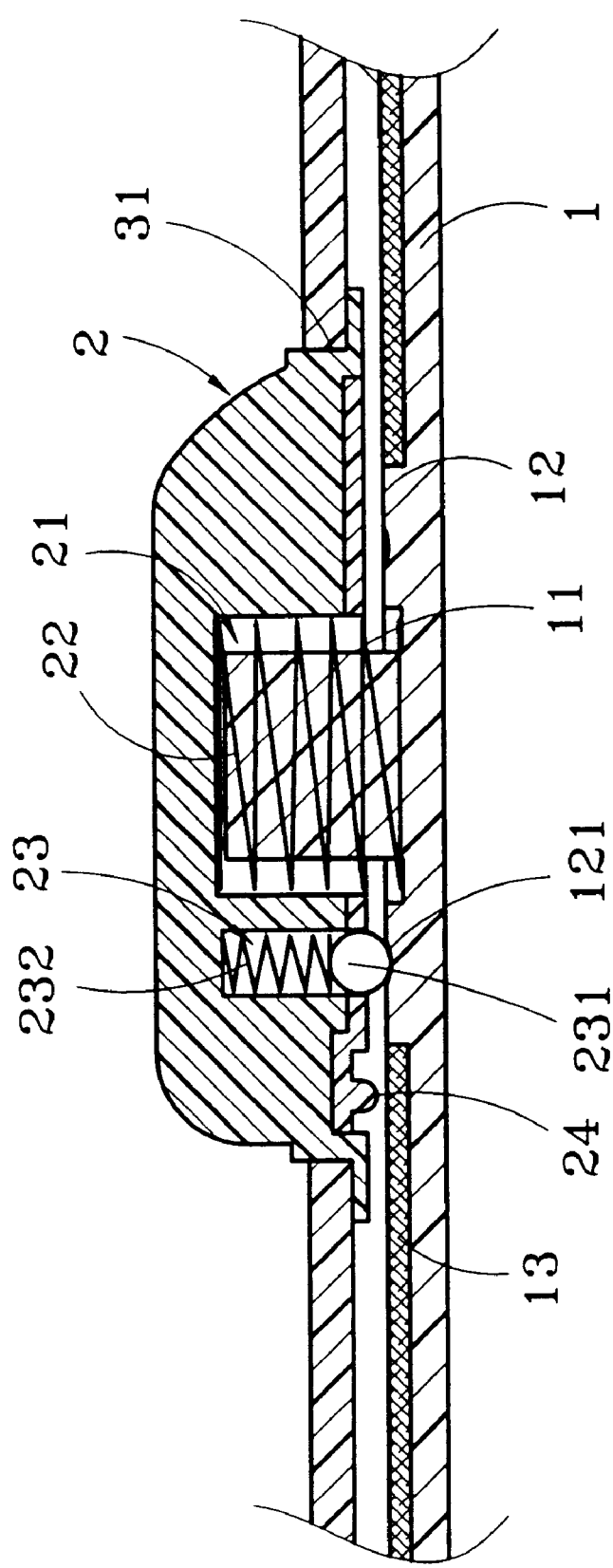
FIG. 4A is a cutaway sectional view along line IV—IV shown in FIG. 2.
Figure 4B:
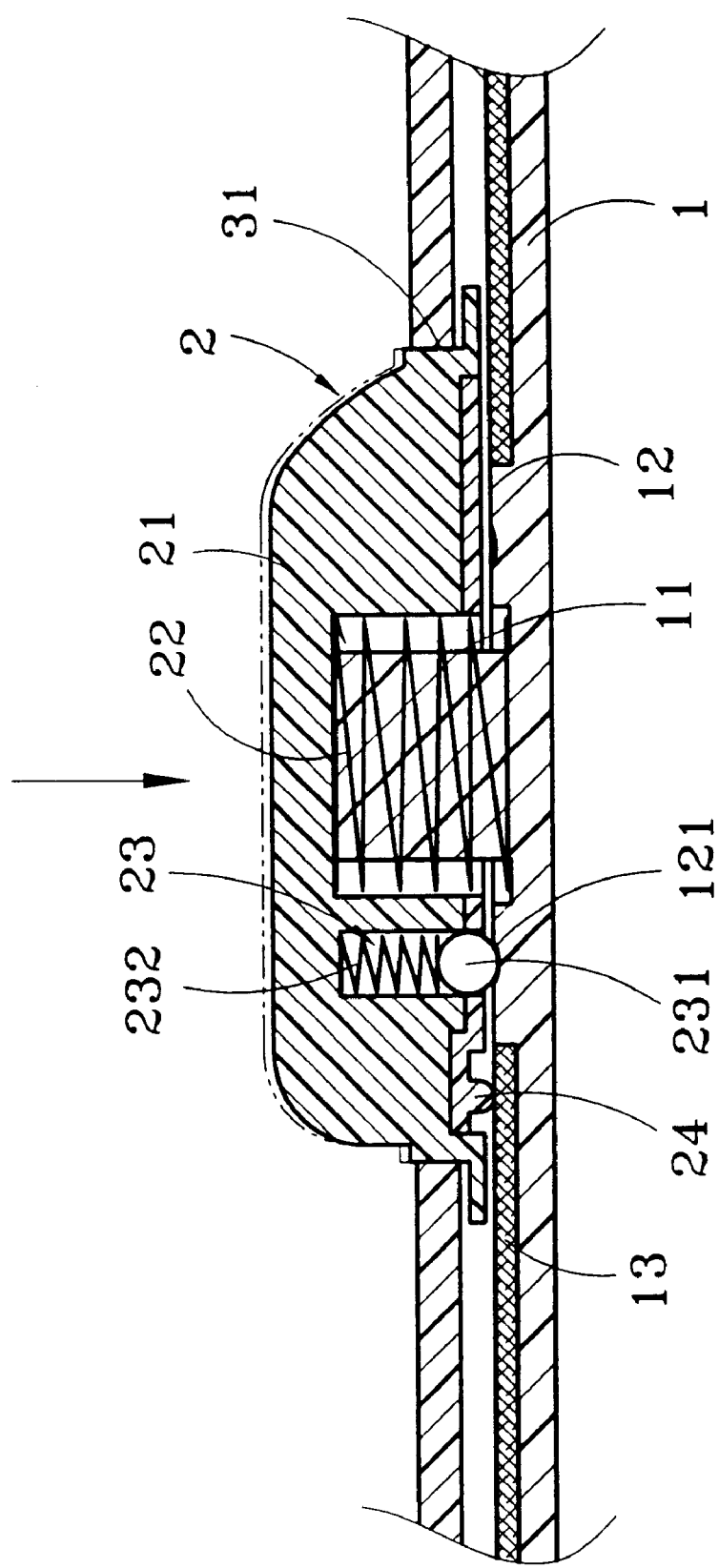
FIG. 4B is a schematic action view of FIG. 4A.

Referring to FIGS. 4A and 4B, when a specified function is desired, the user is supposed to turn the pan body 2, then the positioning mechanism 23 will retract its elastic element 232 for the reason the positioning unit 231 is pressed upwardly by the positioning portion 12. When an orienting arrow on the pan body 2 points the specified item 32, the user should stop turning to enable the positioning unit 231 of the positioning portion 12 to be located at a due locating dimple 121 again, then click the pan body 2 to make connection of the click portion 24 at the bottom end of the pan body 2 with one of the contact points of the thin-film circuit 13 that will transmit a function signal to the computer for execution.

For example, if the abovesaid function item 32 is web link, all the user has to do is turn the pan body 2 until its arrow orients toward the specified item, then click to send a signal to the computer through the thin-film circuit 13 for web link.

If another turnable functional pushbutton is provided to the keyboard of this invention, the user can further link different web sites after web link is made for ticket reservation, program appreciation, data search, etc.

Figure 5A:
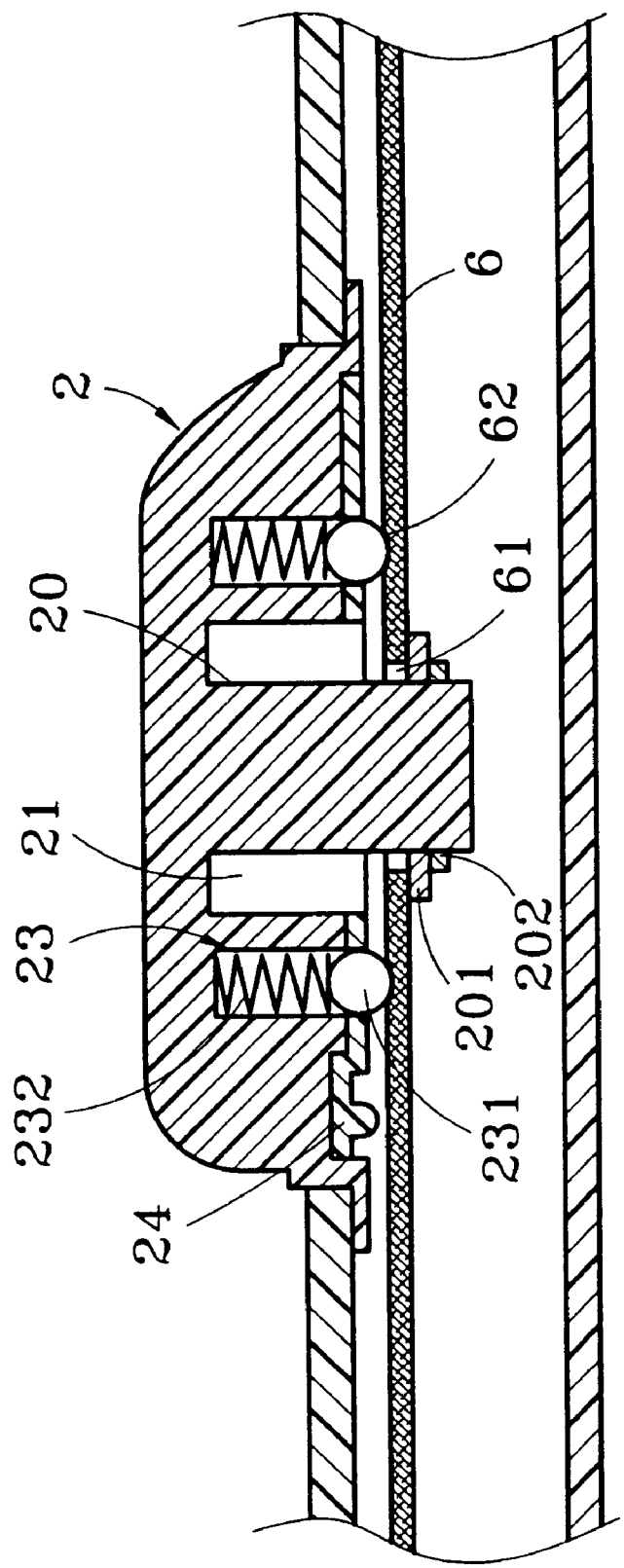
FIG. 5A shows another embodiment of this invention.
Figure 5B:
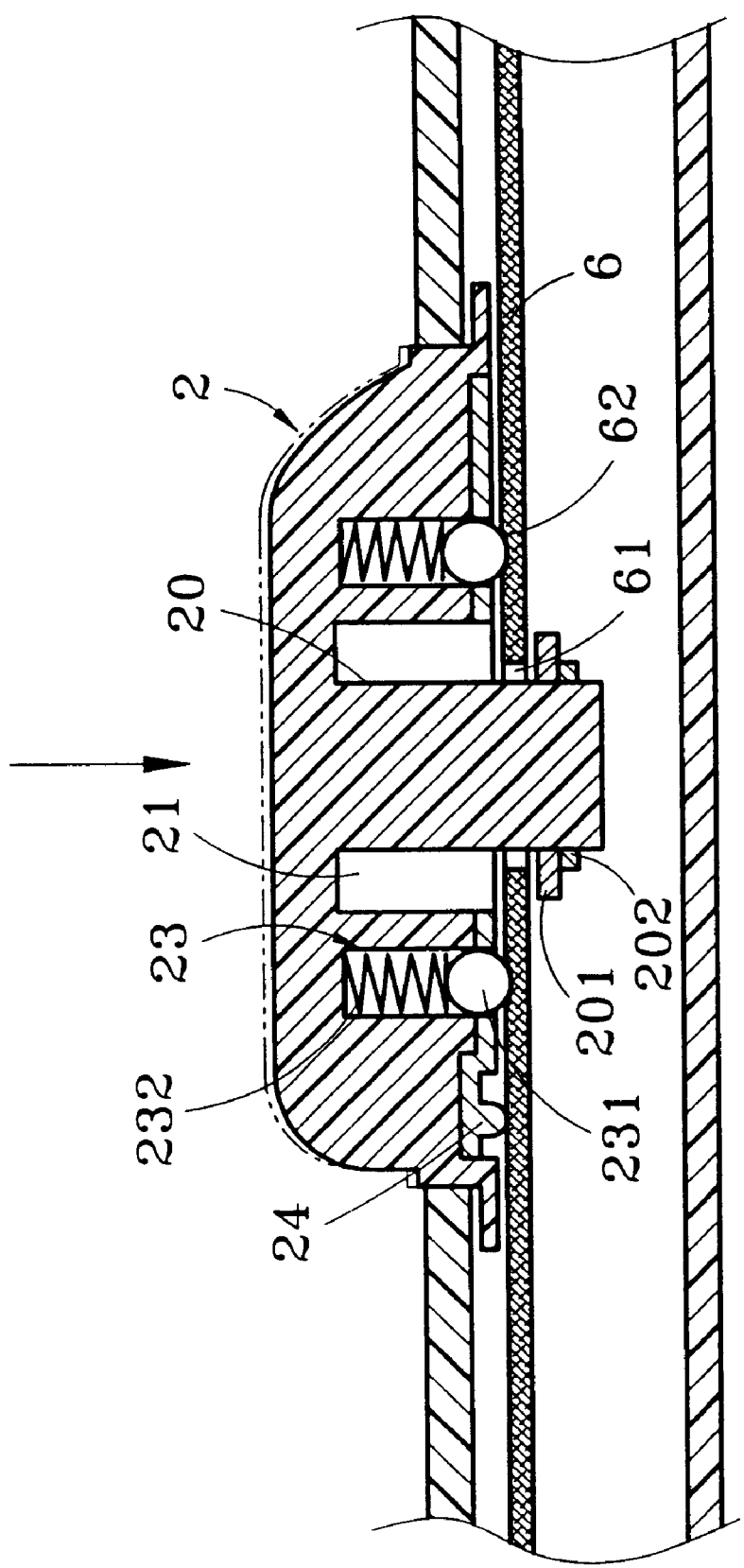
FIG. 5B shows an action view of FIG. 5A.

As shown in FIGS. 5A and 5B, another embodiment of keyboard structure of this invention comprises a top cover 3 having an action district 31, a circuit board 6, and a pan body 2.

The circuit board 6 disposed in the keyboard is provided with a through hole 61, wherein a plurality of locating dimples 62 is disposed peripherally around the through hole 61, and the circuit layout (not shown) is printed outside the locating dimples 62.

A storage portion 21 is provided to the pan body 2, wherein a guide post 20 is extended in the storage portion 21 to penetrate the through hole 61, and a stop element 201 and a limit element 202 are disposed at one end of the guide post 20 for preventing the pan body 2 from loosening or dropping off when the guide post 21 moves. Further, as structure of the positioning mechanism 23 and the click portion 24 are as the same with the abovesaid, repeated description is therefore omitted here.

A user is supposed to turn the pan body 2 so that the positioning mechanism 23 will start action on the circuit board 6, and when the positioning unit 231 rolls to reach and stay on one of the locating dimples 62, the user should click the pan body 2, namely, enables the click portion 24 to touch the circuits on the circuit board 6, in order to transmit an instruction signal; and no sooner has the user's hand departed from the pan body 2, the elastic force of the elastic element 232 of the plurality of positioning mechanisms 23 restores the pan body 2 back to its original position.

Because the functional keys are gathered on a turnable functional pushbutton on a keyboard, the volume of the keyboard can be substantially shrinked for easy operation and for cost reduction.

Moreover, it is possible to print predetermined functional items 32 of a turnable functional pushbutton directly around the action district 31 or attach an adhesive label of the functional items or insert a plurality of indication paper sheets in preset vision windows on a top cover of a computer keyboard.

What is claimed is:

1. An improved keyboard structure, comprising:
    a circuit board with a through hole being disposed in a keyboard;
    a plurality of locating dimples formed on the circuit board peripherally around said through hole;
    a knob having a recess and a guide post extending into said recess and penetrating said through hole;
    a stop element disposed at one end of said guide post;
    at least one positioning mechanism arranged at a bottom face of said knob;
    a top cover having an area for securing the knob; and
    wherein a user is capable of tuning said knob to a specified function and clicking said knob for executing the function.

2. The improved keyboard structure of claim 1, wherein a circuit layout is printed outside said locating dimples in said circuit board.

3. The improved keyboard structure of claim 1, wherein a limit element is disposed at one end of said guide post for preventing said stop element from loosening.

4. The improved keyboard structure of claim 1, wherein said positioning mechanism comprises a positioning unit and an elastic element.

5. The improved keyboard structure of claim 4, wherein said positioning unit is a spherical body.

6. The improved keyboard structure of claim 4, wherein said elastic element is a spring body.

7. The improved keyboard structure of claim 1, further including a click portion disposed at a bottom face of said knob for clicking into contact with said circuit board.

8. The improved keyboard structure of claim 1, wherein a plurality of function items is arranged around said action district peripherally.

9. The improved keyboard structure of claim 8, wherein the plurality of function items are directly printed peripherally around said knob securing area.

10. The improved keyboard structure of claim 8, wherein said function items are printed on a label sheet and adhered peripherally to said knob securing area.

11. The improved keyboard structure of claim 10, wherein a plurality of vision windows are formed peripherally around said knob securing area so that a user can insert the paper sheets of preset function items in said vision windows.

12. An improved keyboard structure, comprising:
    a base having a support portion disposed thereon;
    a knob having a recess disposed therein;
    an elastic element arranged between said recess and said support portion;
    at least one positioning mechanism and a click portion disposed in a bottom portion of said knob;
    a top cover having one area for securing the knob; and
    wherein a user is capable of turning said knob to a specified function and clicking said knob for executing the function.

13. The improved keyboard structure of claim 12, wherein a positioning mechanism is disposed peripherally around said support portion.

14. The improved keyboard structure of claim 13, wherein said positioning mechanism is provided at least one locating dimple.

15. The improved keyboard structure of claim 12, wherein a thin-film circuit is laid peripherally around said positioning mechanism.

16. The improved keyboard structure of claim 12, wherein said elastic element is a spring body.

* * * * *